Patented Mar. 1, 1932

1,847,991

UNITED STATES PATENT OFFICE

HENRY LIVINGSTONE SULMAN AND HUGH FITZALIS KIRKPATRICK PICARD, OF LONDON, ENGLAND

RECOVERY OF TIN FROM ORES AND THE LIKE

No Drawing. Application filed June 4, 1928, Serial No. 282,881, and in Great Britain April 14, 1928.

This invention comprises improvements in the extraction of tin from ores and the like. The term "ores and the like" is intended to include ores, concentrates, tailings and by-products which carry tin in commercially valuable quantity.

According to the invention a process for the recovery of tin from ores and the like is characterized by converting the tin therein to the form of a sulphide of tin and submitting the tin sulphide to an oxidizing gas current at a temperature sufficient to oxidize the tin sulphide, the oxidizing gas current being of sufficient velocity to carry the resulting tin oxide away from the remaining material of the ore or the like in the form of fume. The fume may be separated from the gas current and collected by any suitable means, such as by deposition, filtration in bag houses, and the like methods.

The tin may be converted to sulphide in several ways such as by the use of hydrogen sulphide as a sulphidizing reagent. In this case the reagent provides both the reducing and the sulphidizing agents (as may be indicated by the equation $$SnO_2 + 2H_2S = SnS_2 + 2H_2O).$$

A temperature of dull redness is sufficient to bring about the result.

Alternatively, the tin may be converted to sulphide by treating it with a sulphidizing reagent such as pyrites or sulphur vapour in the presence of a separate reducing agent, for example carbon or carbonaceous matter.

In one form of the process the sulphidization of the ore is effected first and the elimination of the tin as oxide in a separate subsequent step.

A feature of the invention comprises a process for the extraction of tin from ores and the like containing arsenic wherein a sulphidization step is first applied to a charge of said ore or the like to convert the tin and arsenic to sulphide at a sufficient temperature to volatilize and remove the arsenic, and thereafter the tin is eliminated as oxide fume by applying an oxidizing gas current to the hot charge.

In certain cases, however, for example when metals other than tin and capable of volatilization under such conditions, are present in negligible quantity, the sulphidizing and oxidizing operations may be combined. In the presence of a sufficiency of sulphur-yielding material and carbon the sulphidizing of the tin here appears to precede its re-oxidation into tin oxide fume.

A further feature of the invention, therefore, comprises a process as above described wherein the reducing agent is solid carbonaceous matter mixed with the ore, the sulphidizing reagent is a solid body, for example iron pyrites mixed with the ore, and the oxidizing gas current is applied to this mixture which is maintained at the necessary temperature, so that the sulphidizing and oxidizing reactions proceed in such manner as effectively to eliminate the tin as oxide fume in one operation.

It is necessary that the tin-bearing material and the other components of the charge shall be in a state of sufficiently fine division. We have obtained good results from Cornish ores and concentrates which have been ground to pass through a 100 mesh (I. M. M.) screen, although a somewhat coarser powder may give good results according to the character of the material under treatment.

If the tin be present as cassiterite and carbon be the reducing agent employed, the type of the reaction, in its simplest form, may be indicated by the equation:—

$$SnO_2 + S_2 + 2C = SnS_2 + 2CO.$$

The tin oxide, or cassiterite, is converted to sulphide with commercial completeness at a temperature of about 750–800° C., care being taken that the temperature during the sulphidizing stage does not reach that at which sulphide of tin is sensibly volatile. If other substances be present in the ore material which are capable of absorbing or combining with sulphur under like conditions, a further sufficiency of the sulphur yielding material must be added, to ensure that all the tin shall be converted to sulphide. If arsenic be present in the ore it will be eliminated during this sulphidizing step in the form of yellow or orange sulphide of arsenic which may be readily condensed and recovered in a suitable condensing item attached to the sulphidizing retort, furnace, chamber or vessel. If the sulphidized product is not to be submitted immediately to the oxidation blowing step it should preferably be cooled out of contact with air.

The physical condition of the sulphided product is of importance in the operation of our process since the tin sulphide produced as above subsequently requires to be brought into ready and effective contact with the oxidizing current at a temperature which permits of its combustion. The texture of the sulphided product must therefore be kept sufficiently "open" and porous in order to permit the tin sulphide to burn readily to oxide, and to allow free egress to the resulting tin oxide fume. Tin oxide is non-volatile at the temperatures we employ and although by burning the sulphide, as described, the oxide forms a cloud of highly divided particles, i. e. a fume, any particles of the oxide arrested by the mass of the charge may tend to remain therein and to some extent, therefore, to become irrecoverable by further blowing.

According to a further feature of the invention, therefore, the ore before the oxidizing step may be finely divided and made into an open porous charge by incorporation with a material such as will impart an open and porous structure to the resultant charge. For example, the carbonaceous material employed in the sulphidizing step may be coking coal which intumesces and gives a porous character to the charge before it is submitted to the oxidizing step. Several other substances are known for such purposes, such as mixtures of refractory clays with sawdust, or the like.

We may use bituminous coal, and a suitable binder such as tar or pitch, for agglomerating the charge and then submit the product to the coking (and sulphidizing) operation. The proportion of coal used or other suitable carbonaceous material, will vary with the nature of the ore, its tin contents, etc. We have obtained good results by using from 40% to 80% of crushed bituminous coal and a tar binder to the mixture of the tin-bearing material with the sulphur yielding substance; we do not however confine ourselves to these proportions, as in every case experience will determine the best and most economical quantity of coal or carbonaceous substance necessary to afford the required porosity to the charge to be blown.

The coking and sulphiding operations thus take place in the same retort, or apparatus. The main carbonization of the coal and binder takes place at a lower range of temperature, say about 400–500° C., the arsenic present is next eliminated as sulphide, and the sulphidizing of the tin is completed at a temperature range between about 700°–800° C.

In the equation above given the tin sulphide produced is shown as stannic sulphide, $SnS_2$, but stannous sesqui-sulphide, $Sn_2S_3$, or stannous sulphide, $SnS$, may also be produced by the reaction and either or all of these are suitable for the purpose of our invention.

In "agglomerating" the charge of ore or the like with the sulphur-yielding reagent by means of carbonaceous matter and a binder, and coking in order to obtain the necessary porosity, briquetting may be employed. The coked and "sulphidized" briquette product is thereafter "blown" as before described in a suitable furnace at the temperature required to burn the tin sulphide to oxide fume.

The size of the briquette must be chosen so that its tin content may be eliminated with commercial completeness. The size may therefore vary with the nature and tin content of the ore, the proportion of the carbonaceous matter employed, the "open-mass" of texture, or porosity, and so on.

If found desirable the coked and sulphided briquettes, after cooling in a neutral atmosphere, may be broken or roughly granulated to a size which permits the readiest elimination of the tin. These factors (as also the depth of the charge upon the blowing grate or series of grates) will best be determined in each case by experiment, the criterion being the avoidance of recondensation or arrest of more than a commercial minimum of $SnO_2$ fume in the charge itself.

The carbon in the coked and agglomerated mass plays no chemical part in the oxidation reaction beyond consuming its equivalent of the oxygen supplied by the oxidizing current, but it plays an important part in providing a matrix or skeleton to hold back inert finely-divided material, such as gangue, oxide of iron, ash etc. from removal by the gas current and thus to minimize the contamination of the $SnO_2$ fume with unwanted and foreign material derived from the charge. It also separates from each other the metallic sulphide particles which it is required to oxidize and therefore promotes their chance of more rapid oxidation; whilst it persists, it reduces the tendency of the more fusible portions of the mixture to form undue amounts of slag. Finally it supplies fuel to aid in producing or to increase the local heat of the charge mass to the degree required for rapid burning of the tin sulphide to tin oxide fume.

The charge may conveniently be disposed on a grate through which an oxidizing current or blast of suitable velocity may be induced by suction, by means of a suitable fan or the like, which may also be used to force the fume and gas passing through it into the filtration or baghouse apparatus, which, when employed, is the last item in the circuit from the blowing grate or furnace and may be constructed similarly to the apparatus commonly used in the production of zinc-oxide from the blowing of zinc ores.

The oxidizing gas current may if desired, be preheated before passage through the charge. Its requisite pressure will naturally be conditioned by the depth and "open-ness" of the charge on the grate; usually a negative pressure of one or two inches of water in the induced current will be sufficient but the required pressure may easily be modified or regulated by the operator in charge of the grates. A combustion chamber may be added immediately beyond the grate exit which may be furnished with an extra regulated air supply. It may if desired be independently heated, but if properly proportioned it will reach a sufficient temperature by virtue of the heat developed in the blowing grates, and function without further fuel expenditure. Its object is to complete the oxidation of any carbonaceous matters or traces of tar which may be liberated from the charge on the grate.

The depth of the charge on the grate is regulated by the operator to that found most efficient for the particular material to be blown.

As the charge burns out the non-volatilized residues fall, or are stirred by the operator, through the grate; a fresh charge is introduced from time to time as necessary through a charging door above the grate.

Additional fuel may be added if required; or if desired alternate layers of fuel and charge may be added. In any event the blowing operation is first started by providing a glowing bed of fuel upon the hearth to receive the first charge.

In place of a stationary grate or series of grates, a mechanically-operated hearth of chain, or other type, or pallets, may be used to ignite and "blow" the tin from the charge.

It will be understood that in certain cases, i. e. where the constituents of the charge contain no metals other than tin capable of elimination in the form of fume, it may be found unnecessary to carry out the coking and sulphidizing operation as a separate step. In such cases the briquetted charge admixture may be fed direct to the blowing hearth under conditions suitably regulated by the operator in charge, provision being made to ensure the complete oxidation of the volatile hydrocarbons.

The following is an example of one operation in accordance with the process:—

*Example*

A sample of finely ground tin concentrate from the Geevor mine, Cornwall, carrying 31.4% of tin as cassiterite, was mixed with 80% of its weight of pyrites ground to pass a screen having 80 meshes (I. M. M.) per lineal inch and the mixture was then briquetted with 60% of its weight of ground bituminous coal and a tar binder.

The briquettes were carbonized in a retort until nearly all the volatile hydrocarbons were eliminated; the heat was then raised to about 750° C.–800° C. during which period the arsenic present in the concentrates (about 2.5%) was volatilized as an orange yellow sulphide and readily condensed and collected in a condenser tube.

A layer of carbon (coke) was placed upon a suitable enclosed furnace grate and ignited. The sulphidized briquettes (in this case cooled out of contact with air) were roughly broken and then charged on to the glowing coke through which a sufficient current of low-pressure air was induced by a fan to ignite and "blow" the charge.

The tin was rapidly eliminated as tin oxide fume which was collected in a flue and bag-house system and condensed as a white concentrate of nearly pure stannic oxide.

After blowing, the residue left on the grate was assayed and showed 98.2% of the tin in the original concentrate to have been eliminated.

An alternative procedure for eliminating the tin, in the form of tin oxide fume, from the sulphidized product consists in reducing the latter to a fine powder and feeding it into the flame of a strongly oxidized blast, such as may be furnished by the combustion of powdered fuel, or of gas, or other combustible vapours; or again the finely powdered sulphidized product may be injected with air into a chamber heated to a sufficient temperature to cause the tin sulphide to be converted into tin oxide fume.

It is obvious that several methods may be adopted for eliminating tin as oxide fume without departing from the nature of our invention.

One advantage of our process is that a large proportion of the tin oxide fume is recovered in a form which may be used for enamelling or for such other purposes as require an opaque white oxide of tin. Any small proportion of impurity such as ash from the grate which may be mechanically carried over with the oxide, may be separated therefrom by bolting, levigation or other known means; or alternatively the oxide of tin may be smelted to metallic tin in the usual manner.

We claim:—

1. A process for the extraction of tin from ores and the like comprising the steps of converting the tin to sulphide by treating it with a sulphidizing reagent in the presence of a separate reducing agent and submitting the tin sulphide to an air current at a temperature sufficient to oxidize the tin sulphide but insufficient to cause fusion of the charge, the air current being of sufficient velocity to carry resulting tin oxide away from the charge as fume.

2. A process for the extraction of tin from ores and the like as claimed in claim 1 comprising the steps of mixing solid carbonaceous matter and a solid sulphidizing agent with the ore, and applying an oxidizing gas current to this mixture while maintaining it at the necessary temperature, so that the sulphidizing and oxidizing reactions proceed in such manner as effectively to liberate the tin as oxide fume in one operation.

3. A process for the extraction of tin from ores and the like as claimed in claim 1 comprising the steps of admixing the ore first with coal and briquetting and coking the mixture before sulphidizing.

4. A process for the recovery of tin from ores and the like comprising the steps of admixing a charge of the material to be treated with carbonaceous material and a solid sulphidizing reagent, heating the mixture in an open porous condition, and passing air therethrough in such quantity that oxidizing conditions are maintained throughout the charge and tin as oxide fume is liberated and carried away in the air current.

5. A process for the recovery of tin from ores and the like comprising the steps of admixing a charge of the material to be treated with carbonaceous material and a proportion of pyrites, heating the mixture in an open porous condition, and passing air therethrough in such quantity that oxidizing conditions are maintained throughout the charge and tin as oxide fume is liberated and carried away in the air current.

6. A process for the recovery of tin from ores and the like comprising the steps of admixing a charge of the material to be treated with carbonaceous material and a solid sulphidizing reagent, heating the mixture in an open porous condition to a temperature of at least red heat but not sufficient to produce molten slag from the charge, and passing air therethrough in such quantity that oxidizing conditions are maintained throughout the charge and tin as oxide fume is liberated and carried away in the air current.

7. A process for the recovery of tin from ores and the like comprising the steps of admixing a charge of the material, to be treated with carbonaceous material and a solid sulphidizing reagent, heating the mixture in an open porous condition to a temperature of approximately 750–850° C., and passing air therethrough in such quantity that oxidizing conditions are maintained throughout the charge and tin as oxide fume is liberated and carried away in the air current.

8. A process for the extraction of tin from ores and the like, comprising the steps of admixing the ore, containing tin in the form of cassiterite, with carbonaceous material and a solid sulphidizing reagent and burning the mixture upon a grate in a stream of air such as to maintain oxidizing conditions throughout the charge and to carry away tin as oxide fume from the charge.

9. A process for the extraction of tin from ores and the like, comprising the steps of admixing the ore, containing tin in the form of cassiterite, with carbonaceous material and pyritic material, and burning the mixture upon a grate in a stream of air such as to maintain oxidizing conditions throughout the charge and to carry away tin as oxide fume from the charge.

In testimony whereof we have signed our names to this specification.

HENRY LIVINGSTONE SULMAN.
HUGH FITZALIS KIRKPATRICK PICARD.